United States Patent
Chan

(10) Patent No.: US 6,564,435 B1
(45) Date of Patent: May 20, 2003

(54) COMBINATION-TYPE CURTAIN HOOK

(76) Inventor: Wen Chuen Chan, PO Box 82-144, Taipei (TW)

( * ) Notice: Subject to any disclaimer, the term of this patent is extended or adjusted under 35 U.S.C. 154(b) by 0 days.

(21) Appl. No.: 10/004,444

(22) Filed: Dec. 5, 2001

(30) Foreign Application Priority Data

Dec. 11, 2000 (TW) ........................................ 89221427 U

(51) Int. Cl.⁷ ...................... A47H 13/00; A47H 15/00; E05D 15/00
(52) U.S. Cl. ...................... 24/716; 24/462; 24/598.2; 24/706.1; 16/87.2; 160/346
(58) Field of Search ................ 24/716, 598.2, 24/706.1, 600.9, 338, 369, 304, 460, 462; 160/346, 347; 16/87.2

(56) References Cited

U.S. PATENT DOCUMENTS

| 1,071,877 A | * | 9/1913 | Cash ........................... 24/716 |
| 4,370,792 A | * | 2/1983 | Watts .......................... 24/716 |
| 5,111,867 A | * | 5/1992 | Horton et al. .............. 160/346 |
| 5,398,388 A | * | 3/1995 | Coleman ..................... 24/462 |
| 5,544,387 A | * | 8/1996 | Yamamoto et al. ......... 16/87.2 |
| 5,636,417 A | * | 6/1997 | Eisenkolb ................... 24/716 |

FOREIGN PATENT DOCUMENTS

| CH | 0967394 | * | 10/1975 | .................. 24/716 |
| JP | 1-242010 | * | 9/1989 | .................. 24/716 |

* cited by examiner

*Primary Examiner*—Victor Sakran
(74) *Attorney, Agent, or Firm*—Leong C. Lei

(57) ABSTRACT

A combination-type curtain hook is disclosed. A combination-type curtain hook having a stitching strap and a moving hook, characterized in that the stitching strap includes a stitching piece having one side being mounted with a plurality of protruded blocks being spaced apart to form a sliding rail, and the other side of the stitching piece is stitched to the folded flap of a curtain, and the moving hook including a pair of protruded arms at one side thereof is engageable with the protruded block and the protruded arms are positioned at the gap formed between each neighboring protruded blocks, thereby the sliding hook slides up and down along the protruded blocks, achieving the positioning and height adjustment of the curtain.

1 Claim, 5 Drawing Sheets

COMBINATION-TYPE CURTAIN HOOK

BACKGROUND OF THE INVENTION (a) Technical Field of the Invention

The present invention relates to curtain hook, and in particular, to a combination-type curtain hook for which the height of the curtain mounted with this hook can be adjusted and positioned.

(b) Description of the Prior Art

Taiwanese Utility Model Patent Application No. 87206563 discloses a plastic curtain hook 1, as shown in FIG. 1, wherein a flat plate 11 is stitched onto curtain. However, the drawback of this conventional hook is that the height of the curtain mounted with this hook cannot be adjusted. Taiwanese Utility Model Patent Application No. 86214586 relates to a curtain hook 2 and curtain mounted with this hook can be adjusted to a desirable height. The suspension hook 21 is provided with toothed rail at the sides thereof for mounting onto a moving hook 22. The height of the moving hook 22 is adjustable and therefore the height of the curtain is adjustable. The suspension hook 21 has a long supporting arm 211, which can be inserted into a folded flap of the curtain to support the curtain. The moving hook 22 moves along the moving arm 212 downward but not moves upward so as to position the curtain. The drawback of this conventional curtain hook is that the curtain hook 2 has to be inserted into the folded flap of the curtain manually. If cleaning or washing of the curtain is needed, the curtain hook 2 has to be removed. This is a time-consuming and laborious.

SUMMARY OF THE INVENTION

Accordingly, it is an object of the present invention to provide a combination-type curtain hook, which mitigates the drawbacks of curtain being not adjustable in height or the curtain hook being unloadable for cleaning/washing purposes.

Yet a further object of the present invention is to provide a combination-type curtain hook, wherein the curtain hook comprises a stitching strap having one side being mounted with a plurality of protruded blocks as a sliding rail, and a moving hook having a hook arm and a pair of protruded arms, such that the protruded arms can be positioned on the gap formed between two neighboring protruded blocks.

Still another object of the present invention is to provide a combination-type curtain hook, wherein the moving hook is engaged to the protruded blocks positioned on the stitching strap.

An aspect of the present invention is to provide a combination-type curtain hook having a stitching strap and a moving hook, characterized in that the stitching strap includes a stitching piece having one side being mounted with a plurality of protruded blocks being spaced apart to form a sliding rail, and the other side of the stitching piece is stitched to the folded flap of a curtain, and the moving hook including a pair of protruded arms at one side thereof is engageable with the protruded block and the protruded arms are positioned at the gap formed between each neighboring protruded blocks, thereby the sliding hook slides up and down along the protruded blocks, achieving the positioning and height adjustment of the curtain.

Other object and advantages of the present invention will become more apparent from the following description taken in conjunction with the accompanying drawing.

DETAILED DESCRIPTION OF THE PREFERRED EMBODIMENT

Figure 1:
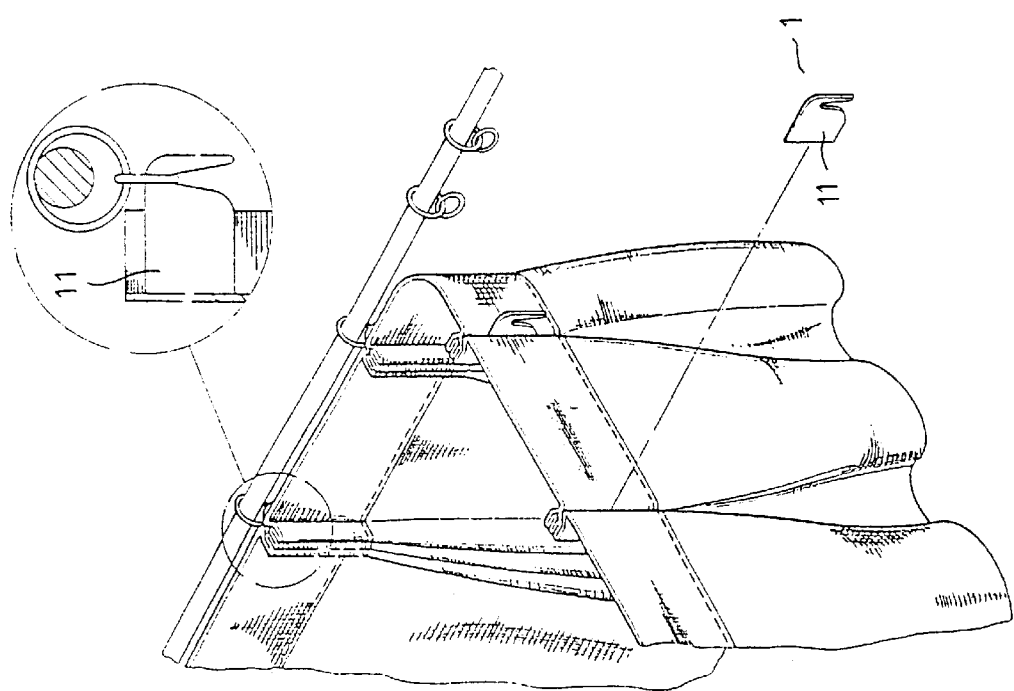
FIGS. 1 and 2 are schematic views of curtain hooks depicted respectively in Taiwan Utility Model Patent Application No. 87206563 and 86214586.
Figure 2:
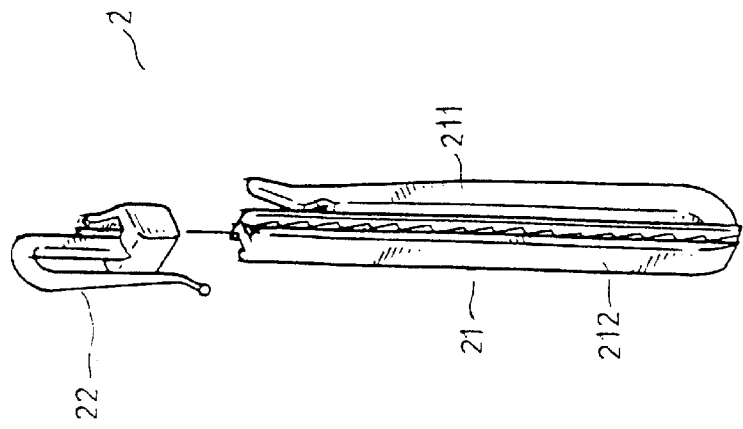
Figure 4:
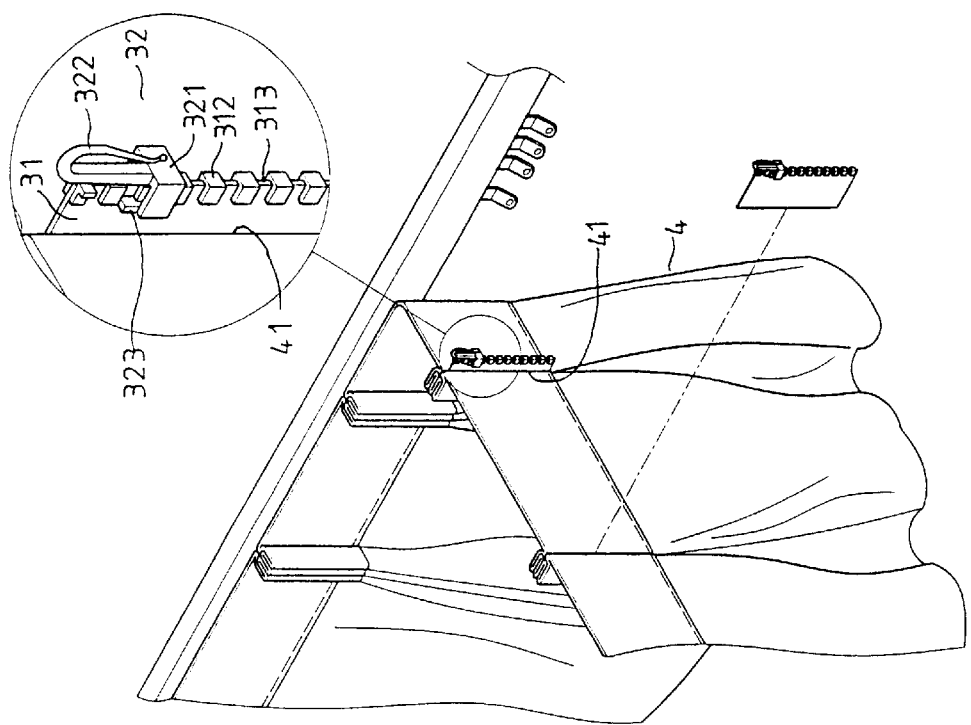
FIG. 4 is a perspective view showing the application of a combination-type curtain hook of FIG. 3.
Figure 3:
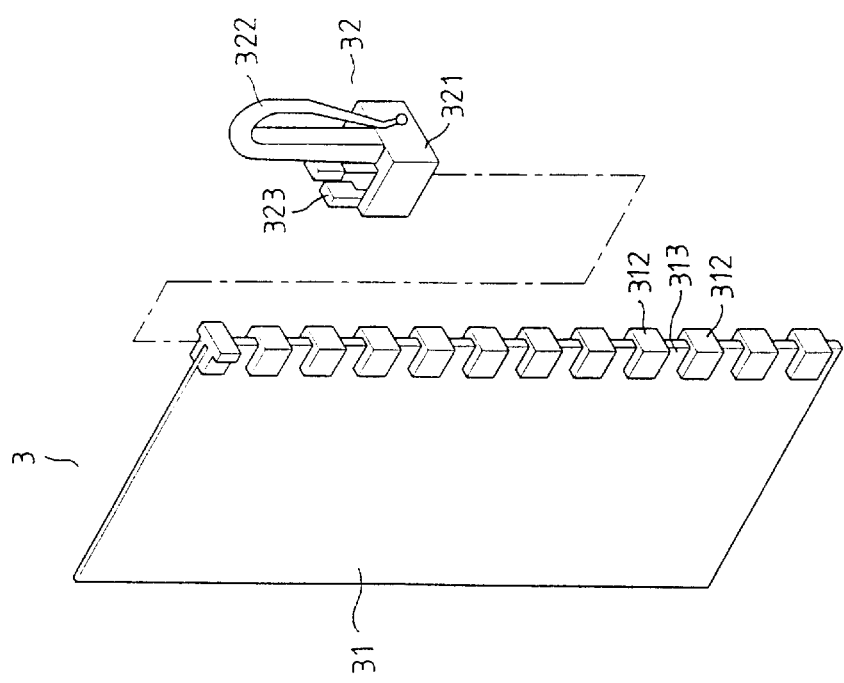
FIG. 3 is a perspective view of a combination-type curtain hook in accordance with the present invention.

Referring to FIG. 3, there is shown a combination-type curtain hook 3 comprising a stitching strap 31 and a moving hook 32. One side of the stitching strap 31 is provided with a plurality of protruded blocks 312 being formed into a sliding rail. The stitching strap 31 is made from cotton cloth or artificial fiber cloth and the protruded blocks 312 are made from plastic or stainless steel material. The plurality of the protruded blocks 312 are spaced apart and a gap 313 is formed between two neighboring protruded blocks 312. The moving hook 32 which is in engagement with the protruded blocks 312 includes a pair of protruded arms 323 for slidably mounting to the protruded blocks 312 and a hook arm 322 both being positioned onto a moving frame 321. The length of the protruded arm 323 is about the wide of the gap 313. Thus, as shown in FIG. 4, when the moving hook 32 is in engagement with the protruded blocks 312 of the stitching strap 31, the moving frame 321 is framed at the protruded blocks 312. When the moving frame 321 moves along the protruded blocks 312 until the protruded arms 323 is positioned at the gap 313, the top end of the protruded arm 323 urges the bottom face 314 of the protruded blocks 312, and the moving hook 32 will not be able to move further, i.e., the hook 32 is positioned at the stitching strap 31. As the protruded arm 323 is located at the top of the moving frame 321, when the moving hook 32 is pushed downward, the protruded arm 323 will be extended to move downward along the protruded blocks, and the moving hook 32 can stop at the required position. Thus, the required height of the curtain can be adjusted and positioned.

As shown in FIG. 4, the stitching strap 31 is stitched to the curtain, and the moving hook 32 is engaged to the protruded block 312. Thus, the curtain can be unloaded for cleaning or washing without removing the curtain hook as that of the conventional curtain hooks structure.

Figure 6:
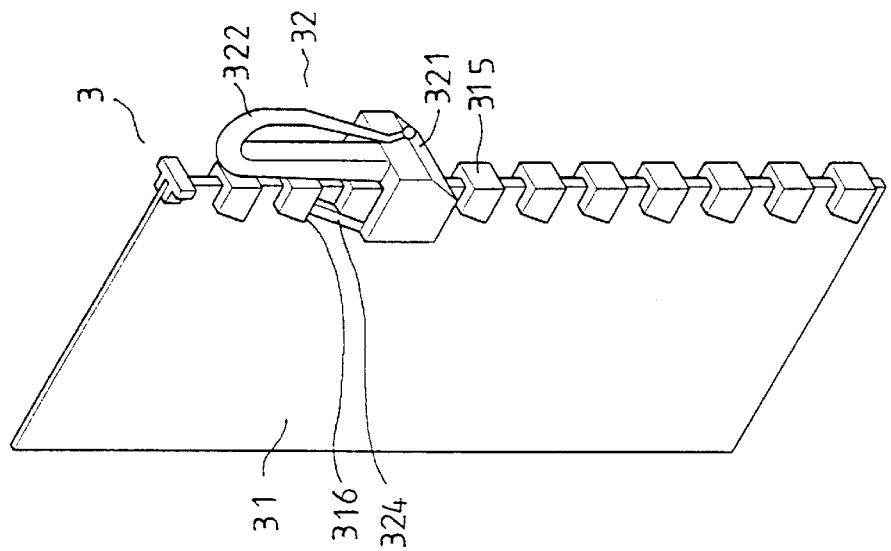
FIG. 6 is a perspective view of a combination-type curtain hook of FIG. 5.
Figure 5:
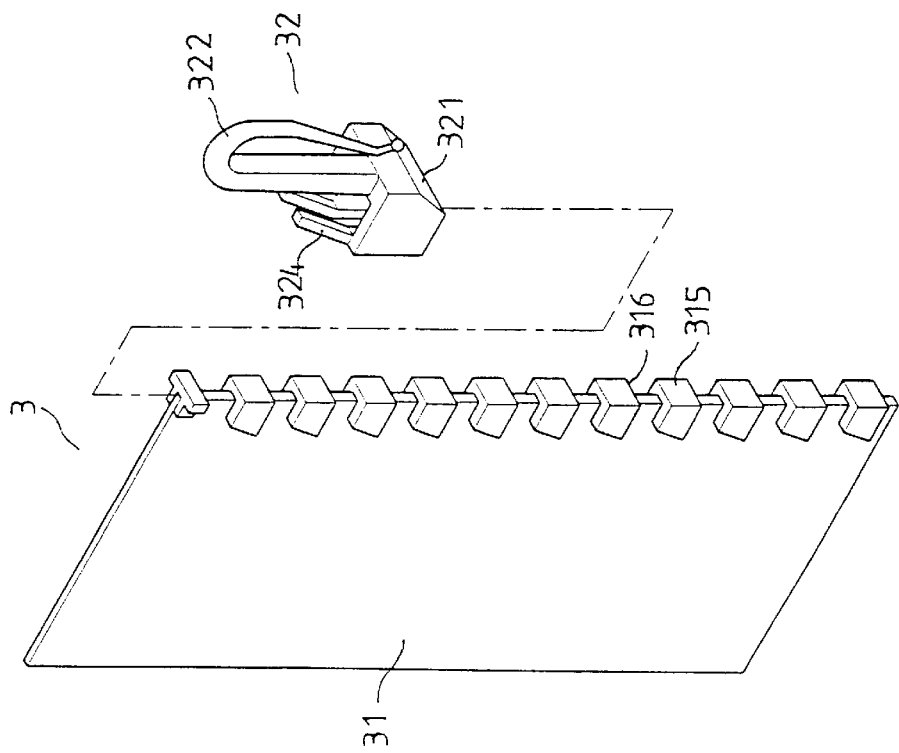
FIG. 5 is a perspective exploded view of another preferred embodiment of a combination-type curtain hook of the present invention.
Figure 7:
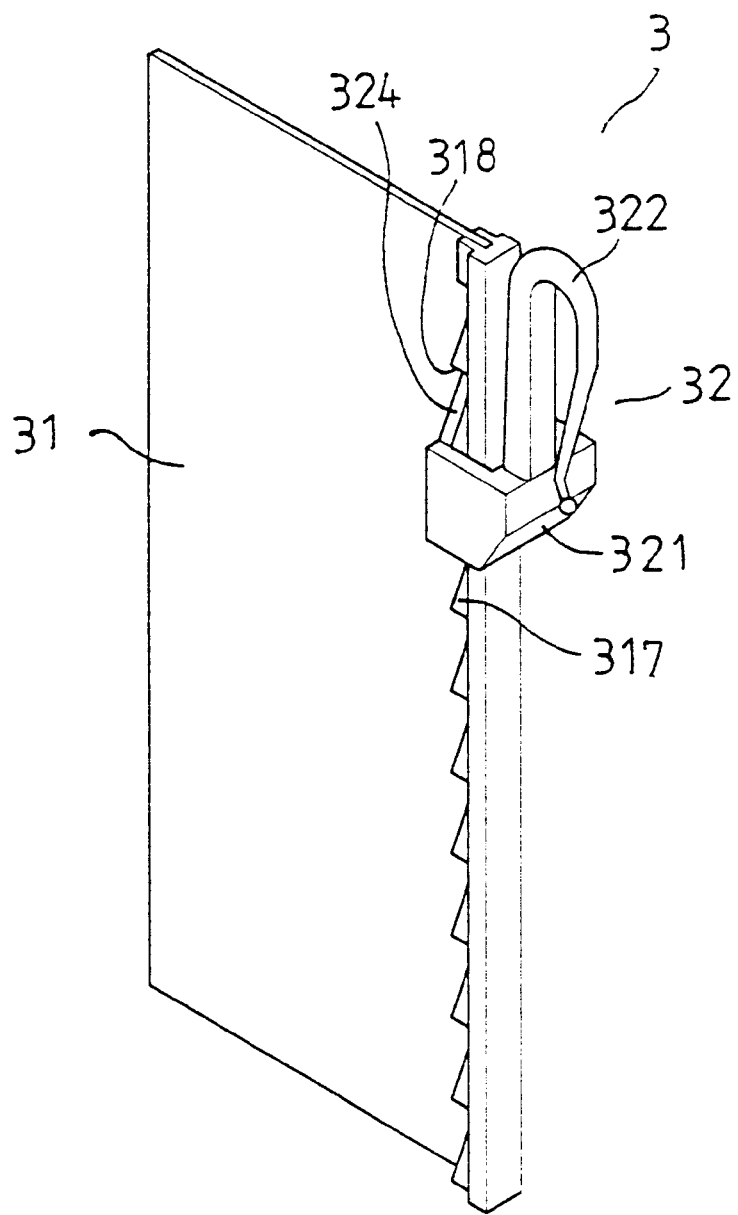
FIG. 7 is a perspective view of a further preferred embodiment of a combination-type curtain hook of the present invention.

As shown in FIG. 5, when the protruded block 315 is made into a trapezoid shape, the protruded arms 324 have to be mounted at the inner wall of the moving frame 321. When the moving hook 32 is engaged with the trapezoid protruded blocks 315, as shown in FIG. 6, the protruded arms 324 move along the protruded blocks 315 until the arms 324 urge the bottom face 316 of the protruded block 315. Thus the moving hook 32 is positioned. As shown in FIG. 7, the protruded blocks 315 can be formed into a continuous block as a sliding rail 317 without formation of gaps. The moving frame 321 is in engagement with the sliding rail 317 and moves up and down. The protruded arm 324 urges the cleave 318 of the sliding rail 317 and the moving frame 321 is stationery. Thus, the objective of positioning or height adjustment of curtain is achieved.

Figure 8:
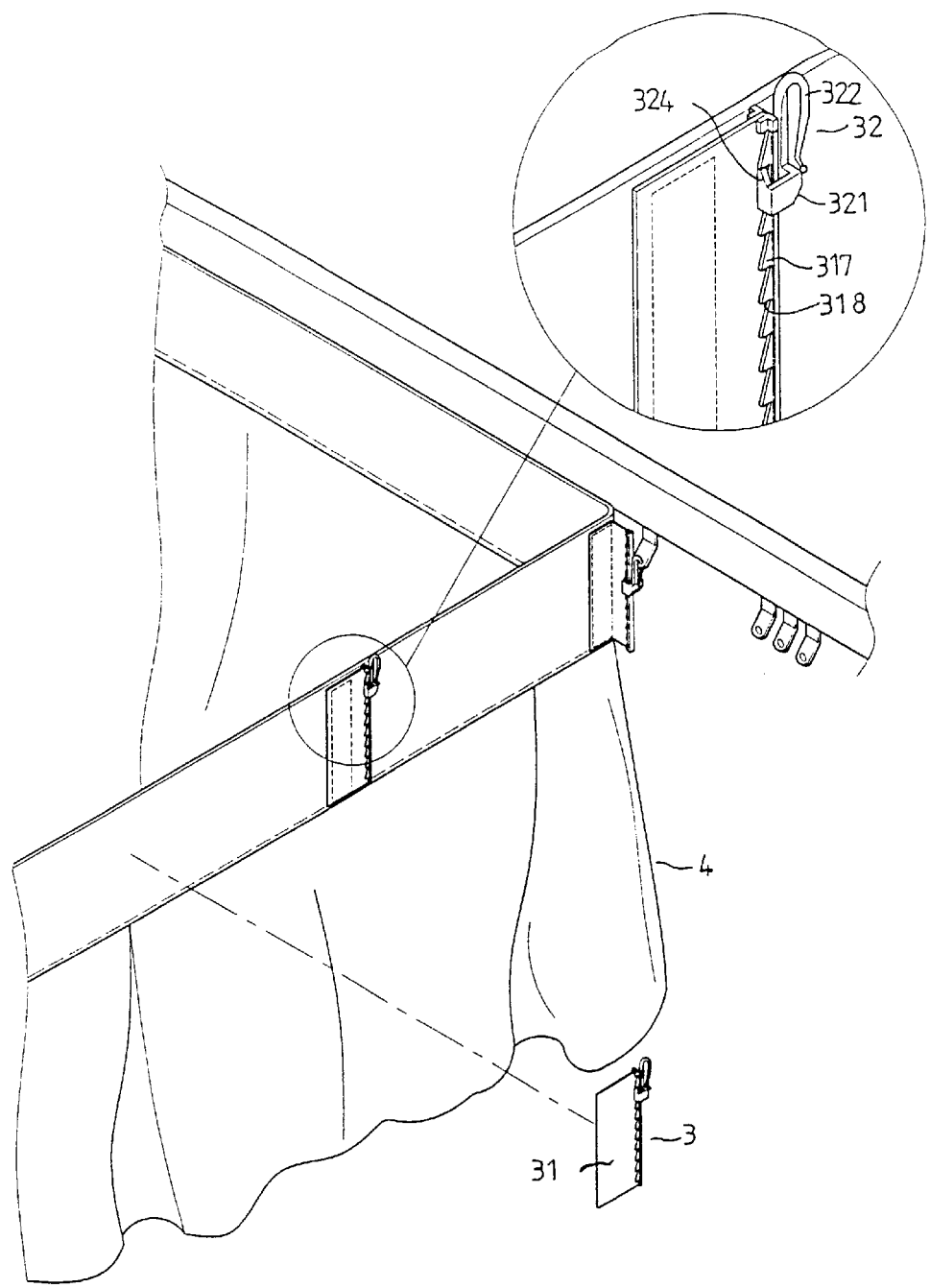
FIG. 8 is a perspective view showing the application of a combination-type curtain hook of the present invention.

In application, as shown in FIG. 8, the curtain hook of the present invention can be directly stitched to the curtain or hooked onto the moving rings (not shown) on the curtain rail (not shown).

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A combination-type curtain hook having a stitching strap and a moving hook, characterized in that the stitching strap includes a stitching piece having one side being mounted with a plurality of protruded blocks being spaced apart defining a gap therebetween to form a sliding rail, and the other side of the stitching piece is stitched to the folded flap of a curtain, and the moving hook including a pair of protruded arms at one side thereof is engageable with the protruded block and the protruded arms are positioned at the gap formed between each neighboring protruded blocks, thereby the sliding hook slides up and down along the protruded blocks, achieving the positioning and height adjustment of the curtain, wherein one side of the stitching strap is a sliding rail without gaps and the inner side or the outer side of the sliding rail is provided with teeth-like structure to urge against the protruded arm of the sliding hook.

* * * * *